Patented Feb. 2, 1926.

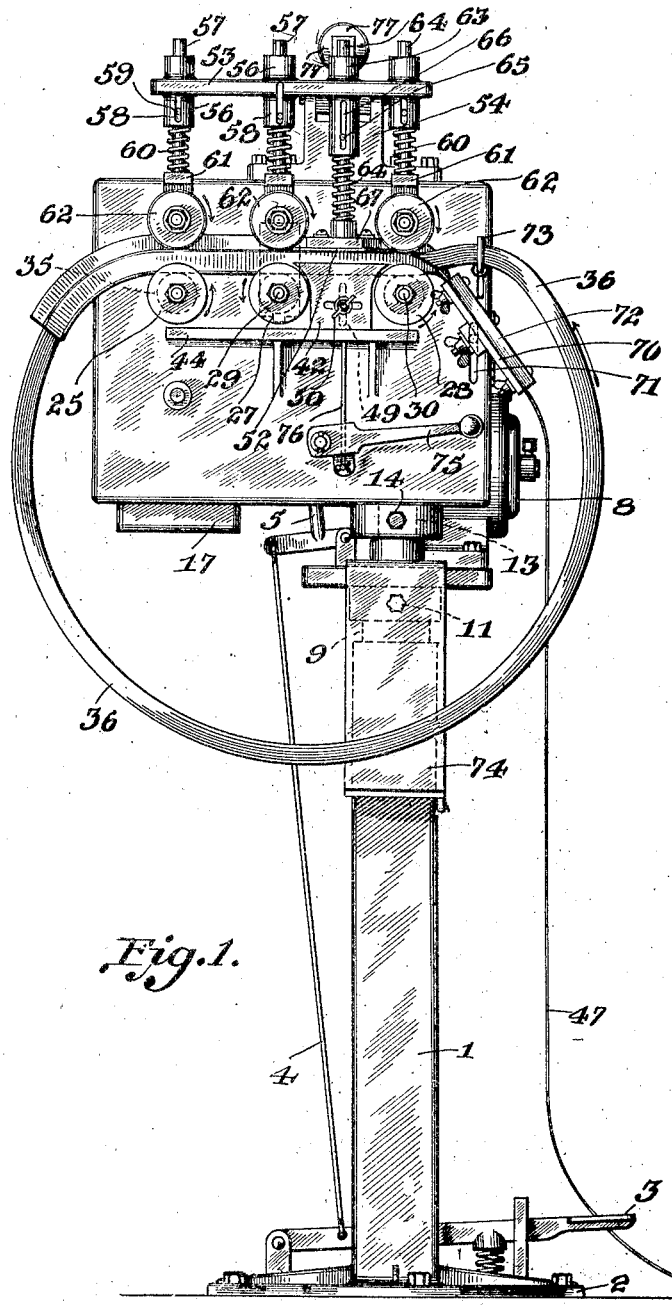

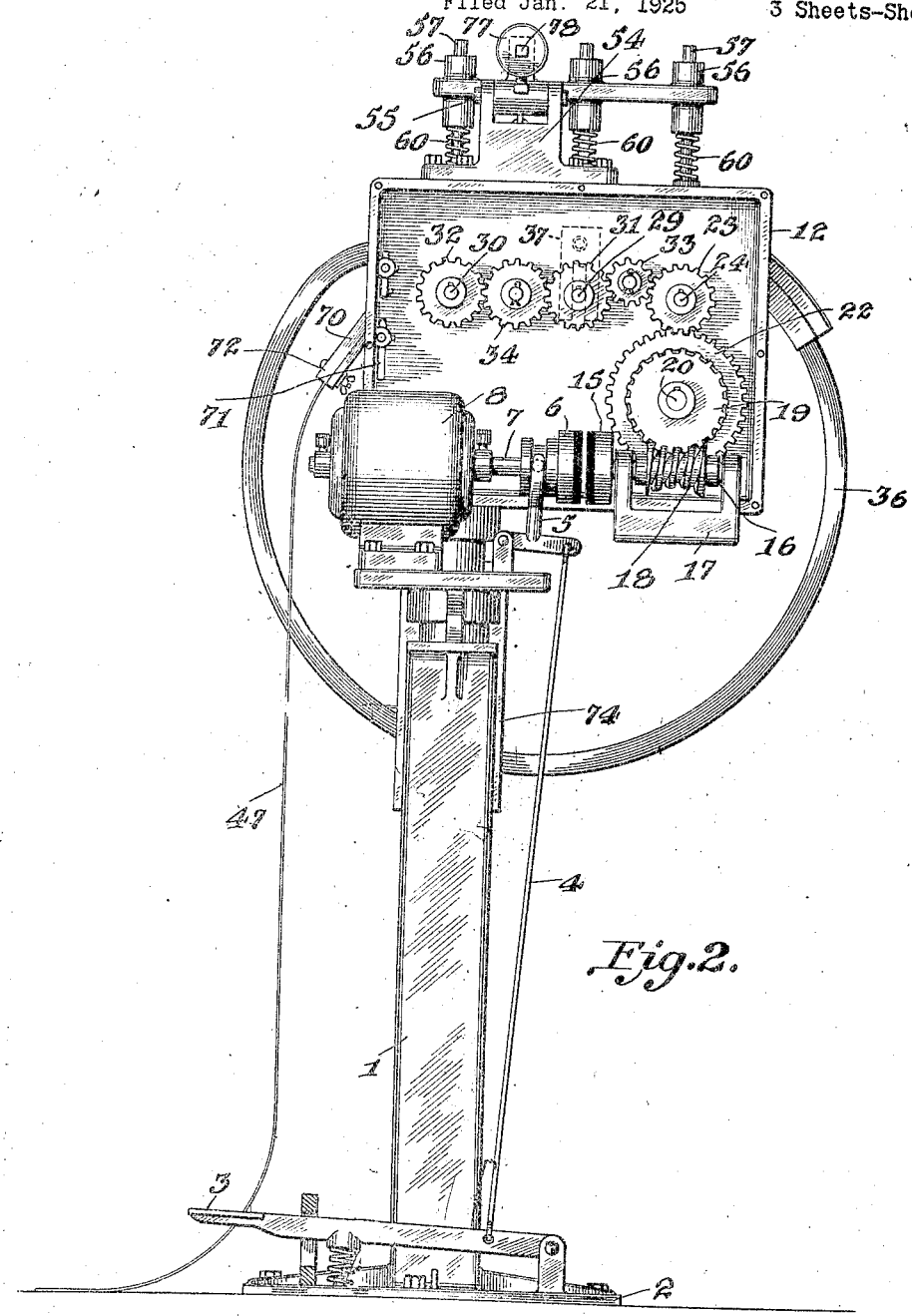

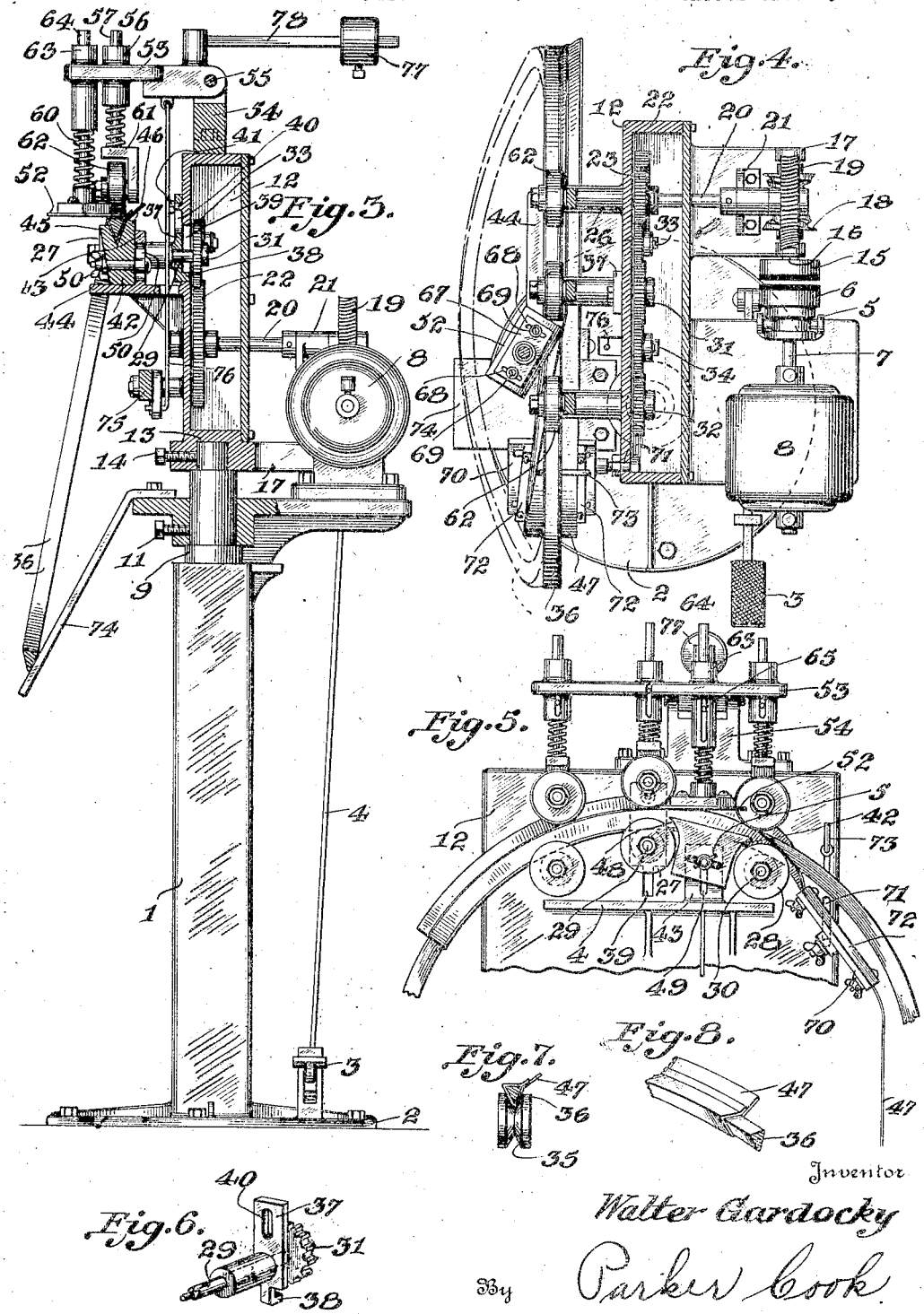

1,571,404

UNITED STATES PATENT OFFICE.

WALTER GARDOCKY, OF CONSHOHOCKEN, PENNSYLVANIA.

MACHINE FOR PLACING FLIPPER STRIPS ON TIRE BEADS.

Application filed January 21, 1925. Serial No. 3,757.

*To all whom it may concern:*

Be it known that I, WALTER GARDOCKY, a citizen of the United States of America, residing at Conshohocken, in the county of Montgomery and State of Pennsylvania, have invented certain new and useful Improvements in Machines for Placing Flipper Strips on Tire Beads, of which the following is a specification.

My invention relates to new and useful improvements in machines for covering a tire bead, or as known in the art, placing the flipper strip on the tire bead.

One of the objects of the present machine is to so construct the same that it will be possible to neatly apply the flipper strip to the bead in an extremely rapid manner, in fact, in from five to six seconds, depending somewhat on the skill of the operator, and the rate at which the machine is run.

Still another object of the invention is to provide a machine wherein the circular bead may be quickly placed on a set of rolls by simply lifting a pivoted carriage, after which the flipper strip will be placed under the bead and against the first roller and the machine then started, the bead quickly making a complete revolution and the flipper strip being forced tightly around the bead, one portion left extending outwardly beyond the side of the bead, so that this strip may be interposed as usual between the layers of fabric when the carcass of the tire is assembled.

At times the beads are provided with an enclosed wire, and the beads have a tendency to retain their circular shape while being handled by the operator. To allow for this form of bead, the present invention contemplates the raising of the central rollers, and the three pairs of these rollers will be about the arc of a circle, thus doing away with the necessity of making the bead lie in a horizontal plane when passing through the machine.

Still another object of the invention contemplates the construction of a machine having a tiltable carriage carrying a series of small rollers and also a means for guiding the flipper strip inwardly and over the bead so that the last two series of rollers will rightly press the flipper strip to the bead. Also, in conjunction with this guiding means and tiltable carriage, a guide block with a V-shaped groove is used, the rear portion of the same being in a higher plane than the front portion, so that the flipper strip will be pressed tightly against the three sides of the bead and at the same time will allow for and guide the portion of the flipper strip that extends outwardly from the top of the bead.

Still another object of the invention is to provide a machine which is semi-portable, comprising a base or standard with a motor mounted thereon, which motor is to run the mechanism for placing the flipper strip on the tire bead. This mechanism comprises primarily three sets of rollers, one in each set being spring-pressed, while a spring-pressed adjustable guide plate operates in conjunction with a guide block and the series of rollers aforementioned, so that the flipper strip may be applied neatly and accurately within a space of about five or six seconds.

With these and other objects in view, the invention consists in certain new and novel arrangements and combination of parts as will be hereinafter more fully described and pointed out in the claims.

Referring now to the drawings showing a preferred embodiment of the invention,

Fig. 1 is a front elevation of the machine, showing the tire bead and flipper strip in their initial position.

Fig. 2 is a similar view taken from the rear of the machine, and with a plate removed to show the gear box.

Fig. 3 is a side elevation of the machine, parts of the same being shown in section.

Fig. 4 is a top plan view of the machine, also partly in section.

Fig. 5 is a fragmentary portion of the machine, showing how one series of the rollers and the guide block may be adjusted for a certain form of tire bead.

Fig. 6 is a detailed perspective showing how one of the rollers of the central pair may be adjusted.

Fig. 7 is a detailed view of one of the lower rollers showing the tire bead fitted therein, and Fig. 8 is a fragmentary perspective of the tire bead with the flipper strip applied thereto.

Referring now to the several views, and to Figs. 1, 2 and 3 in particular, there is shown a pedestal 1 having the base 2, on which is mounted the foot pedal 3 to which is secured the rod 4 which in turn operates the fork 5 for advancing or retarding the one face of the clutch 6 mounted on the shaft 7 of the motor 8. The upper portion of the pedestal 1 is rounded so that a collar 9 may be secured thereon, on which is fastened a shaft or bracket 10, on which the motor 8 is mounted. A set screw 11 is shown for fastening this bracket in the desired position on the rounded portion of the pedestal 1.

Mounted at the upper end of the pedestal 1 is the gear box 12, a suitable collar 13 being provided in which is the set screw 14 so that this gear box may be adjusted in a rotatable manner to properly align the shaft 7 of the motor and the clutch face 6 with the component clutch face 15, the latter mounted on the short stub-shaft 16, which shaft is mounted in a bearing 17 secured to the under surface of the gear box 12. As far as the specification has proceeded, it will be seen that a pedestal, motor and clutch have been provided with means for engaging and disengaging the clutch, while the motor and gear box together with their mountings are so arranged that the motor may be adjusted in a vertical manner, and further that the gear box and motor may also be adjusted in a horizontal manner so that the motor may be correctly aligned.

Mounted on the small shaft 16 is the worm 18 designed to mesh with the gear 19 mounted on the shaft 20, which, in turn, is suitably mounted as at 21, and extends into the gear box, and operates or revolves the driving gear 22. This drive gear 22 is designed to mesh with the gear or pinion 23 which in turn is mounted on the small stub-shaft 24 that extends outwardly through the opposite side of the gear box to drive the roller 25 as may be seen in the several views. This shaft passes through the small hub 26 against which the roller 25 bears.

There are two more of these rollers 27 and 28, and similarly there are the respective shafts 29 and 30 and a small hub is also provided similar to the hub 26, on each of these shafts. On the opposite ends of these shafts 29 and 30, are the gears 31 and 32 and to complete the train, idlers 33 and 34 are provided so that a movement of the gear 22 will drive these rollers in the same direction.

Referring to Fig. 7 for the moment, these rollers are each provided with a groove 35 which is preferably V-shaped to accommodate the V-shaped or triangular bead 36, as also shown in Fig. 8.

Referring now to the rollers 25, 27 and 28, it will be seen in Fig. 1, that they are arranged in a horizontal plane and inasmuch as some tire beads have a wire (not shown) molded within the bead, it is desirable to run the bead through the machine in a circular path as shown in Fig. 5, rather than in a horizontal plane as shown in Fig. 1.

The machine may be made with the rollers 25, 27 and 28 in the horizontal plane, as in Fig. 1, or they might be fixedly set in the position as shown in Fig. 5, but in the present application to accommodate either form of bead, I have shown an arrangement whereby the roller 27 may be adjusted vertically and set in an adjusted position.

In Fig. 6 the gear 31 is shown on the shaft 39, and it will be noted that the shaft is rotatably mounted in the small plate 37 which is provided with a tongue 38 which is adapted to ride in a slot 39 formed in the face of the gear box 12. A slot 40 is formed in the small plate 37 so that this plate, with its shaft and gear, may be locked by a bolt and nut 41 shown in Fig. 3. By so mounting this shaft 29, which of course will carry the roller 27, the roller and gear may be raised to have the axes of the three rollers in the arc of a circle, or it may be lowered to the axes of the other rollers, thus accommodating a bead with or without a wire molded therein.

Of course this gear 31 will be raised or lowered but a slight distance, but should it be desired to raise the same still higher, it would be a simple expedient to put a larger idler 33 between this gear 31 and the gear 23, so that the movement of the train will be complete.

Before discussing the pivotal carriage, there will be noticed that located between the rollers 28 and 27 there is positioned a guide block 42 which is mounted on a small bracket 43 formed on the shelf 44 on the face of the gear box, the front portion 45 of the same adapted to extend to the plane or just above the plane of the upper surface of the rollers, while the rear portion 46 is adapted to extend in a higher plane than the portion 45, so that the flipper strip 47, afterwards to be referred to, will be guided on the further side of the bead against the bead and up and over the portion 46 of the guide block to assume a position as clearly shown in Fig. 8. This guide block 42 is preferably rounded near its opposite ends as at 48 to allow for the periphery of the rollers and at the safe time to extend partly over the periphery of the rollers, as may be seen in Figs. 1 and 5.

To make it possible to adjust this guide block, I have provided a slot 49 in the bracket 43, and also a slot in the guide block 42 for the wing nut 50. When the bead 36 without a wire is to be used, the guide block 42 will be in the position shown in Fig. 1 and will be changed to the position as shown in Fig. 5 when a bead is used having a wire molded therein. A guide plate 52 is positioned directly above this guide block and will be shortly described.

Referring now to the pivoted carriage 53 it will be noted that a bracket 54 is mounted on the top of the gear box in the arms of which is mounted a small shaft 55, on which in turn is mounted the pivotal carriage 53 which comprises the carriage plate having the hubs 56 extending on the opposite side of the carriage plate and in each hub is the small rod 57. A slot 58 is formed in each of the hubs 56 and a pin 59 is in each respective slot so that springs 60 may be placed against the outer surface of the hubs and bear against the small bracket arms 61 secured to the end of the respective rods 57. Mounted on each of these arms is the roller 62 so that when these rollers contact with the flipper strip on the bead they will be spring-pressed to thereby tightly press the flipper strip in place, but at the same time be allowed to vary slightly in their pressure thus allowing for different size beads or irregularities, etc.

A further hub 63 is shown on the carriage plate, in which is likewise mounted a rod 64 having the pin 65 pasing through the slot 66 formed in the lower portion of the said hub 63. On the lower end of the rod 64 the little support or head 67, which in turn carries the guide plate 52 heretofore referred to, and this guide plate is slightly adjustable with regard to the head 67 by providing the slots 68 in the head and using small wing nuts 69 in these slots and bearing on the plate 52.

This guide plate, as may be seen in Figs. 1, 3 and 4 is designed to extend at an angle to the central roller to force a portion of the flipper strip downwardly on the top surface of the bead and to guide the flipper strip across the bead before being pressed, as clearly shown in Fig. 4.

It is necessary that the flipper strip be initiailly positioned when passing under the first roller and to the second roller, and for this purpose a small bracket 70 is mounted in a slot 71 on the gear box, and has the little adjustable guide 72 along its one edge to correctly accommodate the width of the flipper strip 47 and to center the flipper strip with regard to the bead. It will be understood that when I say "center the flipper strip," I mean, correctly position the flipper strip with regard to the bead, so that one edge of the flipper strip will extend shortly beyond the edge of the bead, while the remaining portion of the flipper strip will encircle the bead and extend outwardly beyond the first mentioned edge so that the layers of fabric in the carcass may be afterwards attached hereto.

Just above this bracket 70 is the hook 73 over which the bead 36 will be hung, but if the bead has a wire therein, the hook will not be used.

An apron 74 is shown attached to the pedestal to hold the bead 36 in angular relation to the machine, so that it will not interfere with the flipper strip as it is fed through the carriage into the machine. When it is desired to raise the carriage 53, it is only necessary to force the handle 75 upwardly, which handle is mounted on the gear box 12 and connected with the rod 76 to the carriage 53, while to partly balance the weight of the carriage, a counterweight 77 is slidably mounted on the rod 78, which in turn is secured on the pivoted carriage.

The operation of the device is exceedingly simple, and is as follows:—Supposing that it is desired to cover a bead in which there is no embedded wire, the small handle 75 will be forced upwardly to raise the carriage 53, and the circular bead then placed over the rollers 25, 27 and 28, so that the inverted triangular bead will fit within the grooves of these three rollers. The carriage will then be lowered and the flipper strip placed within the small bracket 70 which has previously had the arm 72 adjusted, and the flipper strip then placed under the bead and against the first roller. The foot treadle 3 will then be depressed, which in turn throws the clutch of the motor into operation and imparts movement to the three rollers through the train of gears previously mentioned. The flipper strip is then guided by the angularly positioned guide plate 52 as well as by the grooves in the first roller and the groove in the guide block, so that by the time the flipper strip passes between the two central rollers, it has completely encased the bead and it is firmly pressed into position, and is then again pressed tightly by the third set of rollers.

Of course the flipper strips are cut to the desired length before being inserted into the machine, and after the bead has made a complete revolution, the foot pedal is released, so that the clutch is thrown out of operation. The handle 75 will again be operated to raise the carriage, and the now completely covered bead will be removed from between the rollers, a new bead thrown over the hook and the cycle continued.

This takes about five or six seconds, so that it is possible to make or cover eight or ten beads within the course of one minute.

The operation with a bead having a wire molded therein is exactly the same, but of course the center roller will be slightly raised and locked into position, and the guide block will be set so that it is not necessary to have the bead in a horizontal plane when passing through the three sets of rollers.

By providing this guide block between the first two sets of rollers, and by providing the angular plate, and by having the guide block provided with a groove similar to the rollers, and the rear portion of the guide block extending higher than the front portion, the applying of the flipper strip to the bead will be quickly and accurately done as the parts are so proportioned and arranged as to not only completely cover the bead, but to allow the strip to extend out from the bead, as is desired.

I am aware that it is old to provide a series of rollers for applying a flipper strip to the bead, and that it is old to use grooved-shaped rollers, and I do not claim the invention broadly as such, but what I do claim and desire to secure by Letters Patent is:—

1. A machine for placing a flipper strip about a tire bead comprising a plurality of rollers and means for driving the same, a tiltable carriage provided with rollers cooperating with the first of said mentioned rollers, a guide block positioned between two of the first mentioned series of rollers and a guide plate positioned above said guide block and extending angularly with relation to the axes of said rollers for correctly positioning the flipper strip across the bead as it is fed through the rollers.

2. A machine for placing a flipper strip about a tire bead comprising a plurality of rollers provided with a V-shaped groove and a guide block also provided with a V-shaped groove extending between said rollers, said guide block extending in a plane at its rear above the plane of the forward edge, means for driving said rollers, a tiltable carriage provided with spring-pressed rollers cooperating with the first mentioned rollers, a guide plate carried by said carriage for guiding the top of the flipper strip across the bead, as the flipper strip and bead are passed between the said rollers.

3. A machine for placing a flipper strip about a tire bead comprising a series of rollers having a V-shaped groove therein, means for driving said rollers, a guide block positioned between the first two rollers of the series and said guide block having a V-shaped groove, the rear of the guide block extending in a plane above the forward portion thereof, a pivotal carriage located above said series of rollers having a series of spring-pressed rollers cooperating with the first mentioned rollers, a spring-pressed guide plate carried by said carriage and extending over the groove in the V-shaped block and at an angle to said block to guide the top portion of the flipper strip across the bead before the bead and flipper strip pass under the second roller of the series, and the remaining rollers tightly pressing the flipper strip into position.

4. A machine for covering a tire bead with a flipper strip comprising a series of rollers and means for driving the same, each of said rollers provided with a groove adapted to receive a tire bead, a correspondingly grooved guide block having its rear edge elevated above its front edge, a tiltable carriage mounted above said rollers and a series of cooperating rollers carried thereby, a guide plate carried by said carriage and adapted to extend at an angle from the axis of the first roller toward the second roller, a guide bracket located in front of the first roller for correctly positioning the flipper strip with regard to the bead and said rollers, the guide block and guide plate forcing the flipper strip tightly about the bead as the flipper strip and bead are passed between the two series of rollers.

5. A machine for securing a flipper strip about a tire bead comprising a standard, a gear box mounted on said standard, a series of rollers extending from the gear box and means for driving the rollers, a guide block extending between the first two rollers of said series, said guide block having a V-shaped groove therein and the rear portion of the block extending above the forward portion of the same, a tiltable carriage, spring-pressed rollers carried by said carriage and cooperating with the first mentioned rollers, a spring-pressed guide plate extending angularly towards said rollers and positioned above said guide block, means for adjusting the angularity of the plate in a horizontal plane, a guide bracket for the flipper strip the guide plate and guide block and rollers forcing the flipper strip correctly about the bead and pressing the same tightly as the flipper strip and bead are run through the machine.

6. A machine for placing a flipper strip about a tire bead comprising a standard, a member on said standard, a series of rollers supported by said member, means for driving the said rollers, said series of rollers extending in a horizontal plane, said rollers provided with a V-shaped groove for the reception of a tire bead, a guide block positioned between the first two of said rollers and also provided with a V-shaped groove registering with the groove in the rollers, a tiltable carriage located above said rollers and provided with spring-pressed cooperating rollers, a guide plate carried by said carriage and extending from without the path of the first roller to across the path of the second roller and adapted to contact with the flipper strip and force the same across the tire bead, means for guiding the flipper strip as it passes under the first two rollers, and said bead being completely covered before reaching the second series of rollers.

7. A machine for covering a tire bead with a flipper strip comprising in part a series of driven rollers provided with a V-shaped groove, a series of idle rollers cooperating with said driven rollers, a guide block located between two of the driven rollers having a V-shaped groove registering with the grooves of the rollers and the rear portion of the block extending in a plane above the front portion thereof, an adjustable guide plate extending angularly across the path of the tire bead and flipper strip for correctly positioning the flipper strip with relation to the bead, the last two driven rollers and their idlers tightly pressing the flipper strip about the bead, and guiding means located ahead of the series of rollers for correctly initially positioning the flipper strip as it is fed to the bead.

8. A machine for securing a flipper strip about a tire bead comprising a series of driven rollers provided with grooves, one of said rollers being adjustable in a vertical plane, a guide block between the first two rollers of said series also having a V-shaped groove and a guide bracket extending in front of the said rollers to correctly position the flipper strip as it is fed to the rollers, a tiltable carriage having spring-pressed rollers cooperating with the first series of rollers, a spring-pressed guide plate carried by said carriage and positioned diagonally across the path of the bead and flipper strip to thereby feed the flipper strip across the tire bead to cover the upper surface thereof, and means for driving the rollers to press the flipper strip about the tire bead.

9. A machine for securing a flipper strip about a tire bead comprising a series of rollers and a guide block, all of which are provided with a V-shaped groove, the guide block arranged to force the flipper strip against the two sides of the bead upwardly, and outwardly on one side and a guide plate for forcing the flipper strip across the top of the tire bead, a second series of rollers cooperating with the first mentioned rollers and mounted on a tiltable carriage, said second series cooperating with the first mentioned series, one of said first mentioned series of rollers being adjustable so that the first series of rollers may extend in a horizontal plane and about the arc of a circle, a guiding means positioned in front of the rollers for initially positioning the flipper strip, and means for driving the rollers to thereby tightly force the flipper strip about the tire bead.

10. A machine for securing a flipper strip about a tire bead comprising a series of rollers and an adjustable guide block, all of which are provided with a V-shaped groove, the guide block arranged to force the flipper strip against the two sides of the bead outwardly on one side, a guide plate for forcing the flipper strip across the top of the tire bead, a second series of spring-pressed rollers cooperating with the first mentioned rollers and mounted on a tiltable carriage, said second series cooperating with the first mentioned series, one of the said first mentioned series of rollers being adjustable so that the first and second series may extend in a horizontal plane and about the arc of a circle, a guiding means positioned in front of the rollers for initially positioning the flipper strip, and means for driving the rollers to thereby tightly force the flipper strip about the tire bead.

11. A machine for securing a flipper strip about a tire bead comprising a series of rollers, a guide block adjustable about a horizontal and vertical axis, all of which are provided with a V-shaped groove, the guide block arranged to force the flipper strip against the two sides of the bead upwardly, and outwardly on one side, a guide plate for forcing the flipper strip across the top of the tire bead, a second series of rollers cooperating with the first mentioned rollers and mounted on a tiltable carriage, said second series cooperating with the first mentioned series, one of said first mentioned series of rollers being adjustable so that the series of rollers may extend in a horizontal plane and about the arc of a circle, a guiding means positioned in front of the rollers for initially positioning the flipper strip, and means for driving the rollers to thereby tightly force the flipper strip about the tire bead.

12. A machine for enfolding a flipper strip about a tire bead comprising a standard, an adjustable support on said standard, a plurality of rollers having grooves formed therein mounted in said support, a guide block extending between two of said rollers having a V-shaped groove therein and the rear of the guide block extending above the front portion thereof, the top of the forward upper edge of the guide block extending in the same plane as the periphery of the rollers, a tiltable carriage mounted on said support and means for tilting the same, a plurality of spring-pressed rollers carried by said carriage and cooperating with said first mentioned rollers, a spring-pressed head carried by said carriage having a horizontally arranged plate thereon, said plate being adjustable in said horizontal plane and positioned above said guide block and extending diagonally across the path of the bead to force said flipper strip across and on the upper surface of said bead, means arranged in front of the rollers for initially positioning the flipper strip with regard to the bead, and means for driving the rollers to thereby tightly press the flipper strip about the bead.

In testimony whereof I affix my signature.

WALTER GARDOCKY.